US008659609B2

(12) United States Patent
Inuzuka

(10) Patent No.: US 8,659,609 B2
(45) Date of Patent: Feb. 25, 2014

(54) MULTI-COLOR DISPLAY DEVICE

(75) Inventor: Tatsuki Inuzuka, Mito (JP)

(73) Assignees: Japan Display Inc., Tokyo (JP);
Panasonic Liquid Crystal Display Co., Ltd., Hyogo-ken (JP)

( * ) Notice: Subject to any disclaimer, the term of this patent is extended or adjusted under 35 U.S.C. 154(b) by 746 days.

(21) Appl. No.: 12/171,318

(22) Filed: Jul. 11, 2008

(65) Prior Publication Data

US 2009/0027410 A1 Jan. 29, 2009

(30) Foreign Application Priority Data

Jul. 25, 2007 (JP) ................. 2007-192947

(51) Int. Cl.
*G09G 5/39* (2006.01)
*G06K 9/36* (2006.01)
*G06K 9/00* (2006.01)
*H04N 9/64* (2006.01)

(52) U.S. Cl.
USPC ............ 345/531; 382/166; 382/162; 348/253

(58) Field of Classification Search
USPC .................................. 345/555, 530
See application file for complete search history.

(56) References Cited

U.S. PATENT DOCUMENTS 5,805,735 A * 9/1998 Chen et al. ..................... 382/239
7,034,788 B2 * 4/2006 Someya et al. ................. 345/89

(Continued)

FOREIGN PATENT DOCUMENTS

JP 60-61724 4/1985
JP 6-7688 1/1994

(Continued)

OTHER PUBLICATIONS

Griswold, N.; Halverson, D.; Wise, G.; , "A note on adaptive block truncation coding for image processing," Acoustics, Speech and Signal Processing, IEEE Transactions on , vol. 35, No. 8, pp. 1201-1203, Aug. 1987.*

(Continued)

*Primary Examiner* — Kee M Tung
*Assistant Examiner* — Zhengxi Liu
(74) *Attorney, Agent, or Firm* — Antonelli, Terry, Stout & Kraus, LLP.

(57) ABSTRACT

It is expected to increase the size of a display panel and the number of tones to be displayed on the display panel, and it is requested to use a display panel displaying M (M>3) types of colors. This requires a large memory capacity and makes a circuit for performing signal conversion complex due to an increase in the amount of data to be subjected to the signal conversion. An image memory stores image data compressed at a fixed compression rate, and the signal conversion is performed on the compressed image data. This technique reduces a memory capacity and simplifies a signal conversion circuit. The signal conversion makes it possible to improve color reproducibility of an image displayed and the quality of the image due to smoothing of the outline of the image. In the case of a display panel having sub-pixels displaying M types of colors, the signal conversion is performed on a compressed signal for each sub-pixel to improve the quality of an image.

17 Claims, 10 Drawing Sheets

(56) References Cited

U.S. PATENT DOCUMENTS

| | | | |
|---|---|---|---|
| 7,069,544 B1* | 6/2006 | Thekkath | 717/128 |
| 7,158,148 B2* | 1/2007 | Toji et al. | 345/613 |
| 7,307,667 B1* | 12/2007 | Yeh et al. | 348/555 |
| 7,505,624 B2* | 3/2009 | Ogden et al. | 382/166 |
| 2004/0027356 A1 | 2/2004 | Takamura | |
| 2004/0161146 A1* | 8/2004 | Van Hook et al. | 382/166 |
| 2005/0184952 A1* | 8/2005 | Konno et al. | 345/102 |
| 2006/0170703 A1* | 8/2006 | Liao | 345/613 |
| 2006/0290831 A1* | 12/2006 | You | 349/56 |
| 2007/0121733 A1* | 5/2007 | Cheung et al. | 375/240.29 |

FOREIGN PATENT DOCUMENTS

| | | |
|---|---|---|
| JP | 11-088700 | 3/1999 |
| JP | 2003-345321 | 12/2003 |
| JP | 2004-70148 | 3/2004 |
| JP | 2005-138421 | 6/2005 |

OTHER PUBLICATIONS

Kurita, T.; Otsu, N.; , "A method of block truncation coding for color image compression," Communications, IEEE Transactions on , vol. 41, No. 9, pp. 1270-1274, Sep. 1993.*

* cited by examiner

FIG. 11

| p0 | p1 | p2 |
|----|----|----|
| p3 | p4 | p5 |
| p6 | p7 | p8 |

351

CONVERSION TABLE
(EXAMPLE OF OUTPUT)

| INPUT SIGNAL (PATTERN OF SELECTION SIGNAL) | OUTPUT SIGNAL (MIXED COLOR RATIO %) |
|---|---|
| 0, 0, 0, 0, 0, 0, 0, 0, 0 | 0 |
| 1, 0, 0, 0, 0, 0, 0, 0, 0 | 10 |
| 0, 1, 0, 0, 0, 0, 0, 0, 0 | 10 |
| 1, 1, 0, 0, 0, 0, 0, 0, 0 | 30 |
| 0, 0, 1, 0, 0, 0, 0, 0, 0 | 10 |
| 1, 0, 1, 0, 0, 0, 0, 0, 0 | 30 |
| 1, 1, 1, 0, 0, 0, 0, 0, 0 | 50 |
| 0, 0, 0, 1, 0, 0, 0, 0, 0 | 10 |
| 1, 0, 0, 1, 0, 0, 0, 0, 0 | 30 |
| --- | - |
| --- | - |
| --- | - |

(1) EMBEDDED IN DRIVE CIRCUIT (2) ADDITIONAL CIRCUIT (3) SOFTWARE TO BE EXECUTED BY CPU CONVERSION SOFTWARE (4) DEDICATED SOFTWARE

MULTI-COLOR DISPLAY DEVICE

BACKGROUND OF THE INVENTION

1. Field of the Invention

The present invention relates to a multi-color display device capable of compressing color image data to store the compressed color image data in an image memory.

2. Description of the Related Art

Human beings recognize color and brightness with three types of visual cells each having different spectral sensitivity by converting external light into three types of electrical signals and determining the color and brightness based on the combination of the three types of electrical signals. According to the human visual characteristics, a color image display device displays a color image by combining three primary colors. Red (R), green (G), and blue (B) colors are used as the primary colors. Any combination of the three colors can be represented as a point located in a three-dimensional space. In general, specifying a point in the three-dimensional space requires three different types of signals.

To display a color image, three or more types of signals can be used. A white color can be used as a color that can be visually brightly viewed since white light includes all wavelengths of the visible spectrum. In addition, cyan and yellow colors can be used as the primary colors to be displayed.

JP-A-60-61724 discloses that white light is used for emission (or transmission) of light in a display device. A liquid crystal display generally includes sub-pixels (each of which is the minimum driving unit) having respective RGB color filters. When a sub-pixel (white sub-pixel) of a white color is added to the sub-pixels having the respective red, green and blue color filters, a color image is displayed with a combination of red, green, blue and white colors. Since the white sub-pixel does not include a color filter, it has high transmittance and serves to improve brightness. Specifically, when a conventional pixel composed of the red, green and blue sub-pixels and a pixel composed of the red, green, blue and white sub-pixels have the same area, the ratio of the area of each of the red, green and blue sub-pixels included in the conventional pixel to the area of each of the red, green, blue and white sub-pixels included in the pixel is 4:3. Each of the red, green and blue color filters cuts off two thirds wavelength components of light emitted by a light source, while the white sub-pixel transmits all components of light emitted by the light source. Based on the abovementioned relationships, the ratio of the maximum amount of light to be displayed on a RGB panel (including red, green and blue sub-pixels) to the maximum amount of light to be displayed on a RGBW panel (including red, green, blue and white sub-pixels) is ((4+4+4)/3):((3+3+3)/3+3×1)=1:1.5. In addition, JP-A-2005-138421 discloses a method for compressing data on a color image using a reduced memory capacity. JP-B-1994-7688 (Japanese Patent No. 1882816) discloses a technique for compressing data on a color image at a fixed compression rate which is not based on the content of the image.

SUMMARY OF THE INVENTION

JP-A-60-61724 describes an example of a technique for displaying an image on a display panel including red, green, blue and white color sub-pixels. A display device using the display panel, however, requires techniques different from conventional ones, such as a transmission technique different from a conventional technique for transmitting red, green and blue (RGB) signals, and a storage technique different from a conventional technique for storing the signals. For example, it is necessary that the display device using the display panel periodically write a signal for each pixel provided in the panel in order to display an image. In addition, a signal may be input from an image source at a timing varied, for example, through a network. To maintain the timing to be constant, an image memory for storing at least one image needs to be prepared in general. The display device having such a configuration is not disclosed in JP-A-60-61724.

The method for compressing data using a reduced memory capacity, which is described in JP-A-2005-138421, was devised with attention paid to the abovementioned image memory. The capacity of the image memory is obtained by multiplying the number of pixels provided in a display panel by the number of bits of each pixel. For example, a display device using signals of M types of colors needs to transmit and store N/3-fold amount of data, compared with the display device using signals of red, green and blue colors. The larger the size of the display panel and the number of bits of each color signal, the larger the data amount. In addition, when a signal of a certain color is input and a signal of a different color from that of the input signal is to be output, means for converting the signal to be output into a signal of the certain color is required. JP-A-2005-138421 describes the technique for compressing data to reduce the memory capacity for the conversion and the load of the signal processing (for the conversion). In the method for compressing data, which is defined in the claims of JP-A-2005-138421, the compression rate is varied depending on the content of an image input. In the method described in JP-A-2005-138421, the data may not be compressed in the worst case. The image output device described in JP-A-2005-138421, therefore, is designed for the worst case and does not have a simplified circuit configuration.

JP-B-1994-7688 discloses the method for compressing data on a color image. In the method, data on a color image is compressed at a fixed compression rate which is not based on the content of the image. JP-B-1994-7688, however, does not disclose operations of a display device, which are required for the method. Specifically, JP-B-1994-7688 does not describe about a complete unit, which is a single image displayed at an operational timing of a display device. Each image is rewritten at an arbitrary timing and periodically read to be displayed. When data is compressed by the compression method and stored in the image memory and pixel data is read and decompressed before all data necessary for reproduction (decompression) of the pixel data is written, the pixel data may be degraded.

A multi-color display device according to the present invention includes an image memory for storing image data on at least one image; a display panel constituting a display screen; means for reading a compressed color signal from the image memory in synchronization with a display operation; means for converting the compressed color signal, which is read from the image memory, into M types of color signals; and means for driving the display panel displaying the M types of color signals.

The multi-color display device according to the present invention is capable of displaying a color image with M types of colors with a reduced amount of data to be transmitted, a reduced capacity of a memory for storing image data and a reduced load of signal processing. The multi-color display device can be achieved with a circuit configuration having a reduced size. In addition, the multi-color display device can be operated with reduced power consumption by reducing the amount of data to be transmitted to reduce the number of times of changes in signals in the circuit. Furthermore, the multi-color display device is provided with the means for converting the compressed color signal into M types of color signals to improve the quality of an image.

BRIEF DESCRIPTION OF THE DRAWINGS

Other objects and advantages of the invention will become apparent from the following description of embodiments with reference to the accompanying drawings in which:

FIG. 11 is an explanatory diagram showing a table illustrating a conversion of values of signals indicating the outline of a character symbol.

DETAILED DESCRIPTION OF THE PREFERRED EMBODIMENTS

Embodiments of the present invention will be described with reference to the accompanying drawings.

First Embodiment

Figure 1:
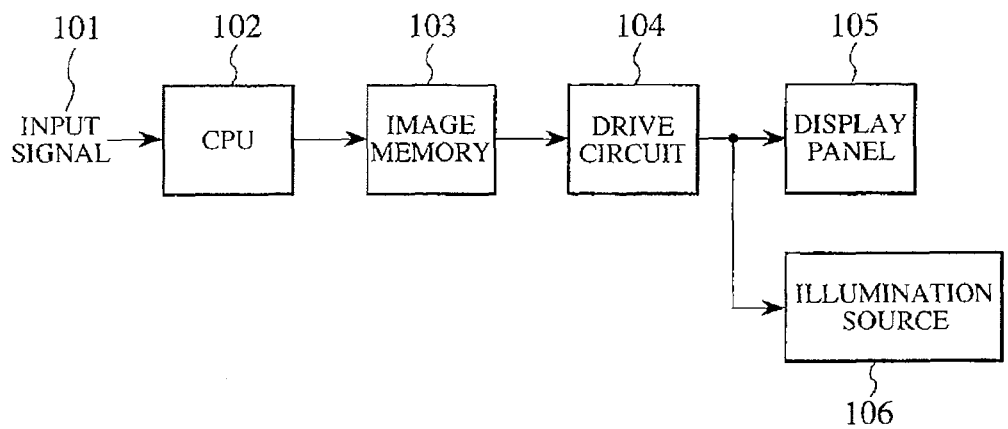
FIG. 1 is a diagram showing a basic configuration of a multi-color display device according to the present invention.

FIG. 1 is a diagram showing a basic configuration of a multi-color display device according to a first embodiment of the present invention. In FIG. 1, an input signal 101 may be picture data, a character code, a draw command, or the like. The signal 101 is input by taking an image with a camera, or through a network, an input operation with a keyboard by a user, or the like. The input signal 101 is interpreted by a central processing unit (CPU) 102 and converted into bitmap data based on an image size, a bit width per pixel and the like. The bitmap data created in the above way is stored in an image memory 103 and read by a drive circuit 104. The bitmap data then forms an image by driving a display panel 105 and an illumination source (backlight) 106. In the multi-color display device, the display panel 105 is a liquid crystal panel. The display panel 105, however, may be another panel based on the display principle. When the display panel 105 is composed of a liquid crystal element, each pixel is composed of sub-pixels having respective primary color filters.

Figure 2A:
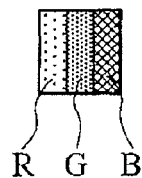
FIGS. 2A and 2B are diagrams each showing an arrangement of sub-pixels constituting a part of a display panel.
Figure 2B:
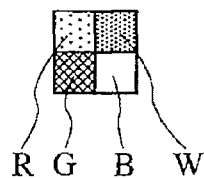

FIGS. 2A and 2B each show an arrangement of sub-pixels constituting the display panel 105. FIG. 2A shows the arrangement of the sub-pixels having red, green and blue (RGB, three types of) color filters, respectively. FIG. 2B shows the arrangement of the sub-pixels having red, green, blue and white (RGBW, four types of) color filters, respectively. The three types of sub-pixels shown in FIG. 2A forms a single pixel, and the four types of sub-pixels shown in FIG. 2B forms a single pixel. Each of the color filters may have any structure and be formed of any material as long as the color filters appropriately function. The white sub-pixel may not have a color filter. A plurality of the pixels (shown in FIG. 2A or 2B) is arranged in a plane. The sub-pixels have respective transmittances. The transmittances of the sub-pixels are controlled to ensure that a display image is formed. The following is described about the display panel composed of the four types (RGBW) of color sub-pixels. The present invention, however, is not limited to the display panel composed of the four types (RGBW) of color sub-pixels, but may be applicable to the display panel composed of M types of color sub-pixels.

In the following description, the input signal 101 is composed of red, green and blue (RGB) color signals. This results from the fact that a large number of existing image sources produce data based on the principle of the three primary colors. The behavior of the input signal 101 is independent from the operation of the display panel 105. Since the display panel needs to display an image at a constant interval, and the image memory 103 has a memory capacity for storing data on at least one image in order to maintain the constant display interval. The amount of data on one image is obtained by multiplying the number of sub-pixels by the number of bits required for driving each of the sub-pixels. For example, consider a pixel composed of three types (RGB) of color sub-pixels. When each of the red, green and blue color signals has 1 Byte (=8 bits) and the display panel has 640×480 pixels, the amount of the input signal 101 is equal to 921,600 Bytes (=3 (RGB color signals)×640×480×1 Byte). The amount of the input signal 101 composed of the four types (RGBW) of color signals is equal to four thirds of the amount of the input signal 101 composed of the three types (RGB) of color signals.

To display an image using the display panel 105, it is necessary to periodically perform an operation for writing a signal for each pixel constituting the display panel 105. In the case of a cathode-ray tube (CRT), a thin electron beam is scanned to excite a fluorescent material provided on a display screen. In the case of a liquid crystal panel, a difference in potential is applied between a signal line extending in a vertical direction and a signal line extending in a horizontal direction to ensure that a capacitor is charged. In the scanning operations, it is necessary to periodically write a signal without a delay. A signal may be input from an image source at a timing varied, for example, through a network. Even if a part of a signal is delayed, an image may be formed as a whole when a portion of the previous image data, which corresponds to the part of the signal, remains. To write such two consecutive signals at appropriate timings, a memory for storing data on at least one image is required.

Figure 3A:
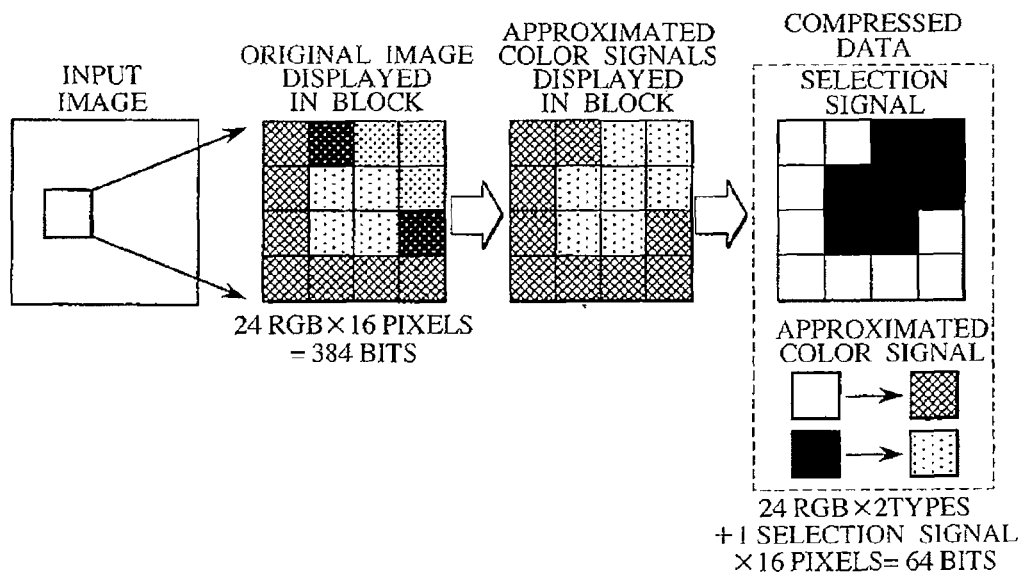
FIG. 3A is an explanatory diagram showing a principle of a compression method according to the present invention.

In the present embodiment, a method for compressing data on a color image is used to ensure that the compressed data is stored in the image memory 103 shown in FIG. 1. The method for compressing data on a color image will be described with reference to FIG. 3A. In FIG. 3A, a display screen displaying an input image is divided into blocks, each of which is composed of a plurality of pixels. The amount of data is reduced by limiting types of colors to be displayed in each of the blocks. For example, a display screen having a plurality of pixels is divided into a plurality of blocks each having 4×4 pixels. Each of the pixels outputs RGB color signals. In each of the blocks, the RGB color signals are approximated to some types of color signals. In this case, the number of types of the approximated color signals is less than the number of pixels included in each of the blocks. When the RGB color signals are approximated to two types of color signals to be represented in each of the blocks, the two types of approximated color signals (2 types×3 colors×8 bits=48 bits) to be represented in each of the blocks and a selection signal (16 pixels'1 bit=16 bits) for each of the pixels are combined to form compressed data. The selection signal is to be used to select one of the two types of approximated color signals. As a result, the compressed data for each block has 64 bits. On the other hand, the original image data for each block has 384 bits (=3 RGB color signals×4 pixels×4 pixels×8 bits). The amount of the original image data is reduced to one sixth of the amount of the original image data. In the abovementioned compression method, the size of the block and the number of types of approximated color signals may be varied. The compression rate is fixed based on the setting of the size of the block and the number of types of approximated color signals.

To decompress the compressed data, one of the approximated color signals to be represented in each of the blocks is selected based on the selection signal for each pixel. The pixels present in each of the blocks are represented by any of the approximated color signals due to the decompression. Since one of approximated color signals is selected based on the selection signal for each of the pixels, the decompression can be achieved in a simple manner at a high speed. After generating approximated color signals for each of the blocks, the compressed data cannot be decompressed to reproduce the original image data (reversibility of the data is lost). Reduction in the quality of an image (such as a picture) represented in each pixel by multi-valued signals due to irreversible compression is small. In the case of a graphic such as a character symbol represented on a white background, the outline of the character symbol can be stored. The degree of reduction in the quality of the image is varied depending on setting values such as the size of each of the blocks and the number of types of color signals approximated in each of the blocks. The degree of the reduction in the quality of the image can be controlled by using the setting values as parameters based on the purpose of use, the configuration of the display device, and the like.

The character symbol is created as a multi-color image in many cases. The types of colors of the character symbol represented in the entire screen are limited. The block is enlarged to the entire screen, and the limited types of the colors of the character symbol can be changed to approximated colors in the entire screen. In this case, approximated color signals to be set are three types of the color signals (RGB color signals) which are based on the principle of multi-color. The types of combinations of the RGB color signals are limited. For a multi-color image such as the picture image described above, the size of the block can be reduced to generate compressed data.

It is known that gamma conversion is performed a signal in an input section of a camera in order to use the gamma-converted signal as an image signal for broadcasting. In order to perform signal processing on a signal having a linear characteristic, conversion processing, which does not conform to the gamma characteristic, is performed on a signal in the input section of the camera, and the gamma conversion is generally re-performed after the signal processing. The description of the gamma characteristic is omitted in the present specification if not otherwise specified. It goes without saying that the gamma characteristic may be combined with any processing.

Figure 3B:
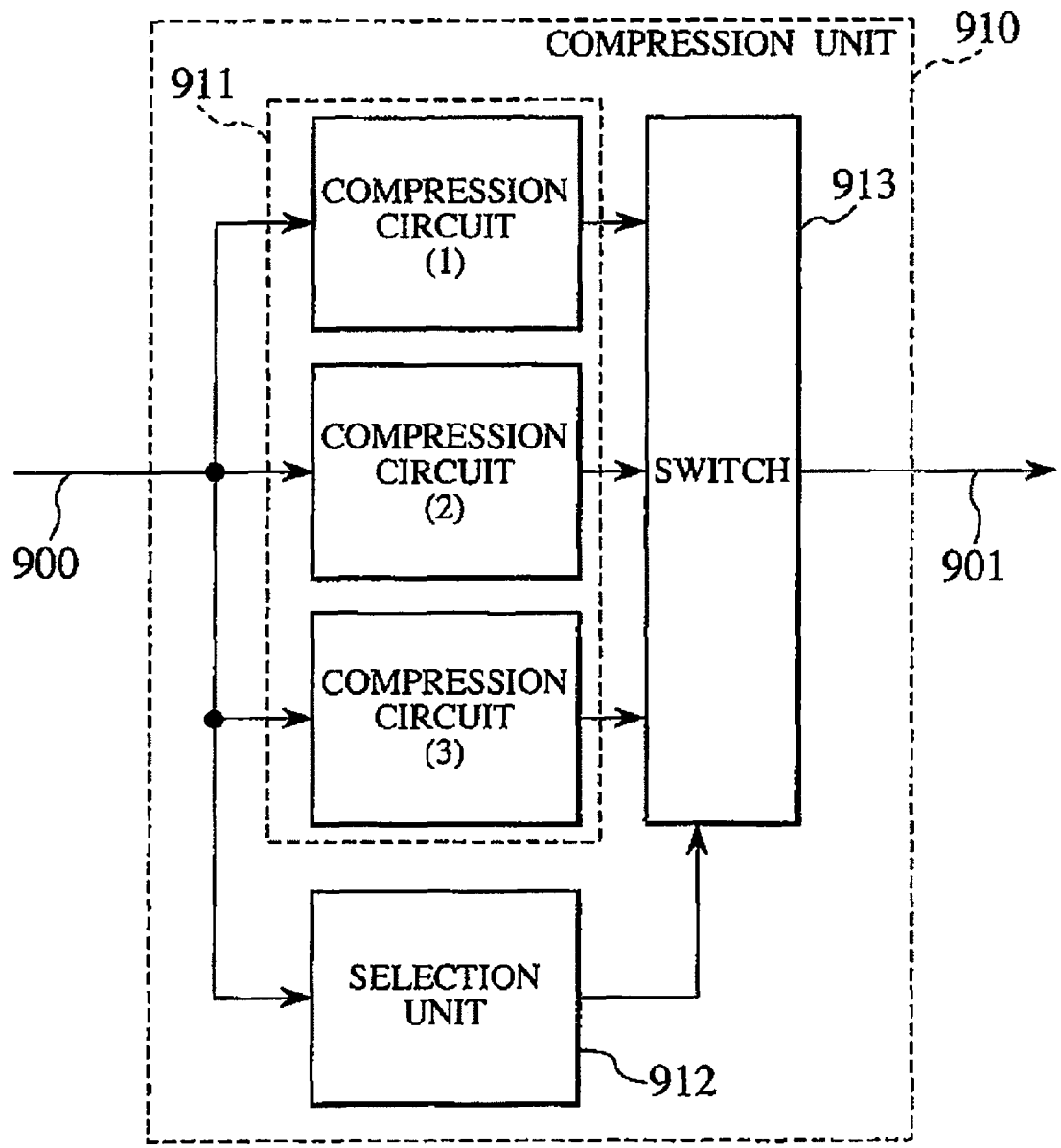
FIG. 3B is a diagram showing the configuration of a compression unit according to the present invention.

The configuration of a compression unit 910 according to the present invention will be described with reference to FIG. 3B. Data compression according to the present invention is irreversible signal processing. Original image data may not be decompressed completely by the compression method according to the present invention. Since a generation unit for generating an approximated color signal is provided, the quality of an image may be varied even when the image is compressed at the same compression rate. The multi-color display device according to the present invention includes a plurality of types of compression circuits 911 for generating respective approximated color signals in respective methods different from each other; a selection unit 912 for selecting any of the methods; and a switch 913 for selecting an output of any of the plurality of types of compression units 910 based on an output of the selection unit 912. In the compression unit 910, the switch 913 switches between the methods (in each of which an approximated color signal is generated in each block) while the compression rate is constant. The compression unit 910 according to the present invention receives an input signal 900, converts the received input signal 900 into compressed data 901, and outputs the compressed data 901.

The structure of the compressed data 901 is constant regardless of the methods in each of which an approximated color signal is generated in each block. The switch operation using the selection unit 912 does not affect decompression processing.

It is convenient that a memory or a register (not shown in FIG. 3B) for temporarily storing data is used in the signal processing. Thus, the memory or the register is used when necessary. The plurality of types of compression circuits 911 shown in FIG. 3B are separated from each other for clarification. However, common hardware parts and common software parts of the compression circuits 911, which perform the same operation, may be combined.

Internal operations of each of the compression circuits 911 are mainly performed in the following order.
(1) Input of an input signal
(2) Generation of approximated color signals to be represented in each block
(3) Generation of a selection signal for selecting one of the approximated color signals for each pixel present in the block
(4) Output of compressed data In the operation (2) for generating approximated color signals, division processing (grouping) may be performed on signals in the block while minimizing an error. For example, (a) a three-dimensional color space (red, green and blue) is prepared; (b) input color signals are arranged in the space; (c) the color signals are grouped in a certain method; and (d) the color signals of each group are averaged to generate an approximated color signal.

However, a distance between any two of the color signals arranged in the three-dimensional color space is not always reflected to a difference between colors perceived by the human visual system. For example, it is apparent that a distance between a red color signal (1, 0, 0) and a yellow color signal (1, 1, 0) is smaller than a distance between the red color signal (1, 0, 0) and a green color signal (0, 1, 0) in the three-dimensional color space. However, the human visual system perceives both the difference between the red and yellow colors and the difference between the red and green colors as large differences. In addition, differences between brightness of colors are combined into the same three-dimensional color space (distance space). Thus, approximated color signals generated by grouping color signals using a single color space (or a distance space to be used to measure a distance between color signals) may not reflect characteristics of the original image.

According to the present invention, a plurality of types of operations is prepared, in each of which approximated color signals are generated. A distance space for calculating an error may be a three-dimensional space having coordinate axes representing respective arbitrary color signals, a two-dimensional space having coordinate axes representing respective luminance (brightness) and chromaticness, a one-dimensional space having a coordinate axis representing luminance (brightness) and the like. Color signals to be output from pixels within each block, which are located in the spaces, are divided and grouped by using a threshold value(s). The color signals of each group, which represent the group, are calculated and used as approximated color signals. In addition, as another method for setting approximated color signals, the frequency of outputs of each color signal represented in the block is calculated to set color signals frequently output among all color signals as approximated color signals. The selection signal for each pixel present in the block can be set as a signal for identifying a group to which the color signals are attributed in the grouping operation (c). Alternatively, an approximated color signal, which is closest to a certain color signal in the distance space, can be calculated to ensure that the approximated color signal is selected. In the abovementioned way, the approximated color signals and the selection signal are combined to form compressed data for each pixel. As described above, the format of the compressed data obtained according to the present invention is not dependent on the method for generating approximated color signals. A switching unit for switching an operation mode of the method for generating approximated color signals to another operation mode may be provided in the compression unit. The switching unit is capable of switching the operation mode of the method for generating approximated color signals when the quality of an image is maintained during the method for generating approximated color signals. The multi-color display device may be configured in which a plurality of types of methods for generating compressed data is prepared and one of compressed data is used.

Figure 3C:
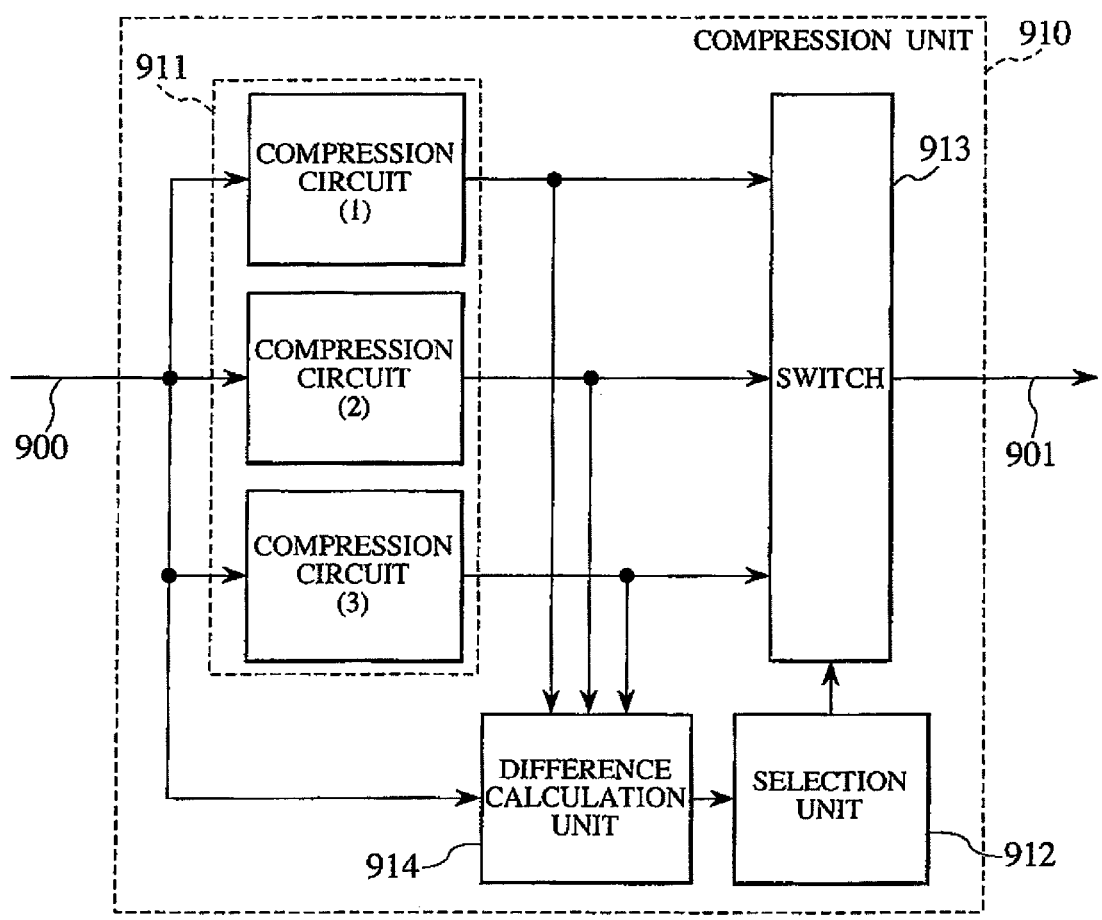
FIG. 3C is a diagram showing another configuration of the compression unit according to the present invention.

The selection unit 912 is adapted to select one of the compression circuits 911. In addition, the selection unit 912 measures signal characteristics within a corresponding block to perform an operation for switching between the compression circuits 911 for each image or each block. For example, the selection unit 912 selects: grouping of color signals on the coordinate axis representing luminance (brightness) when the input signal is composed only of achromatic color signals; grouping of color signals on the coordinate axis representing chromaticness when the input signal is composed only of signals each indicating high chroma colors; and separating of a signal indicating a white background from the input signal and grouping of color signals on the coordinate axis representing chromaticness when the input signal includes the signal indicating a white background and high chroma color. Using the configuration shown in FIG. 3C, a plurality of types of compressed data is generated for each block. After that, based on the difference between the generated compressed data and the input signal, the compressed data (compressed unit), which is most approximate to the input signal, can be selected by the selection unit 912. The operations of the signal processing are as follows.

(1) The plurality of types of compression units 910 generates respective compressed data 901.
(2) A difference calculation unit 914 calculates the difference (between the input signal and a signal obtained by decompressing the compressed data 901) for each pixel on a block basis. As a method for calculating the difference for each pixel, mean square errors between RGB color signals are used.
(3) The selection unit 912 compares the differences with each other to select the compressed data, which is most approximate to the input signal.
(4) Based on the above result of the selection, the switch 913 outputs the selected compressed data.

The operations of the compression unit 910 and the operations of the selection unit 912 do not affect the format of the compressed data. The type and the internal configuration of the compression unit 910 may be updated. In the above method, the compressed data is selected for each block. Compressed data, which is approximate to the input signal for each image, may be selected after the operation for switching the configuration of the compression unit 910 is repeatedly performed a plurality of times. The method for decompressing the compressed data is not dependent on the abovementioned configurations of the compression unit 910.

When the compression circuits are replaced with software, for instance, the operations of the difference calculation unit 914 and the operations of the selection unit 912 can be achieved as a loop statement including a requirement for selecting compressed data, which is most approximate to the input signal. The loop is repeated to allow for switching between methods for generating approximated color signals. The method using the loop has an advantageous that compressed data, which is most approximate to the input signal, can be obtained without determining operations of the method for generating approximated color signals and the operations of the selection unit in advance. In addition, signal processing included in the loop statement may be updated. The loop statement may be repeated using a time used for the compression processing as a constraint to ensure that the difference (between the compressed data and the input data) is minimized (to improve the quality of an image) as the processing time is increased. Since the format of the compressed data is not dependent on the updated signal processing, it is not necessary that the decompression method is changed.

On the other hand, when the selection method used by the selection unit 912 can be determined before generation of the compressed data, the switch 913 may be provided on the upstream side of the compression circuits 911 to ensure the input signal 900 is input to the selected compression circuit.

The number of groups divided within the block can be selected. The number of types of approximated color signals to be generated is the same as the number of groups divided within the block. When there is only a single group, the block is represented by a single approximated color signal. It is meaningless that the number of groups divided within the block is larger than the number of pixels within the block. The size of each block, the number of groups divided within each block, and the like can be changed. A signal indicating the contents of the changes may be added to allow the compressed data to be decompressed without an error.

Figure 4:
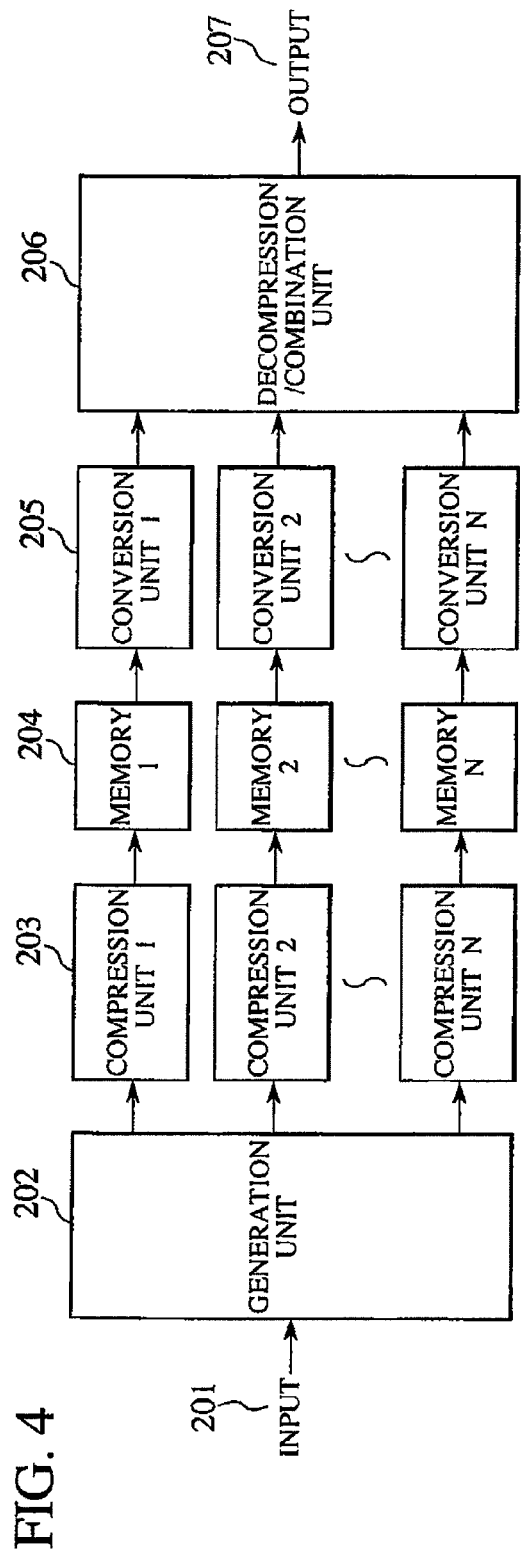
FIG. 4 is an explanatory diagram showing operations of signal processing on N types of image data, according to the present invention.

FIG. 4 is a diagram showing the configuration of the multi-color display device having a unit 202 for generating N types of image data such as picture data and a character symbol;

compression units 203 for switching parameter settings to be used for N types of compression methods, respectively; N types of image memories 204; conversion units 205 for respectively performing signal conversion on signals read from the image memories 204; and a decompression/combination unit 206 for decompressing and outputting compressed data in synchronization with a display timing.

According to the present invention, since the format of the compressed data can be determined based on the set parameters, the synchronization of the display timing can be easily achieved in the multi-color display device having N types of signal paths. When the compression rate is varied, the synchronization is also varied. It is necessary that the multi-color display device be configured for the worst case. The amount of the compressed data may be larger than that of the original data depending on the compression method in the worst case. The circuit configuration of the device designed for the worst case may be more complex than that of the device which does not use the compressed data.

According to the present invention, the compression rate is fixed to maintain the reduction in the amount of data to be constant. Therefore, the configuration of the multi-color display device can be simplified.

Figure 5:
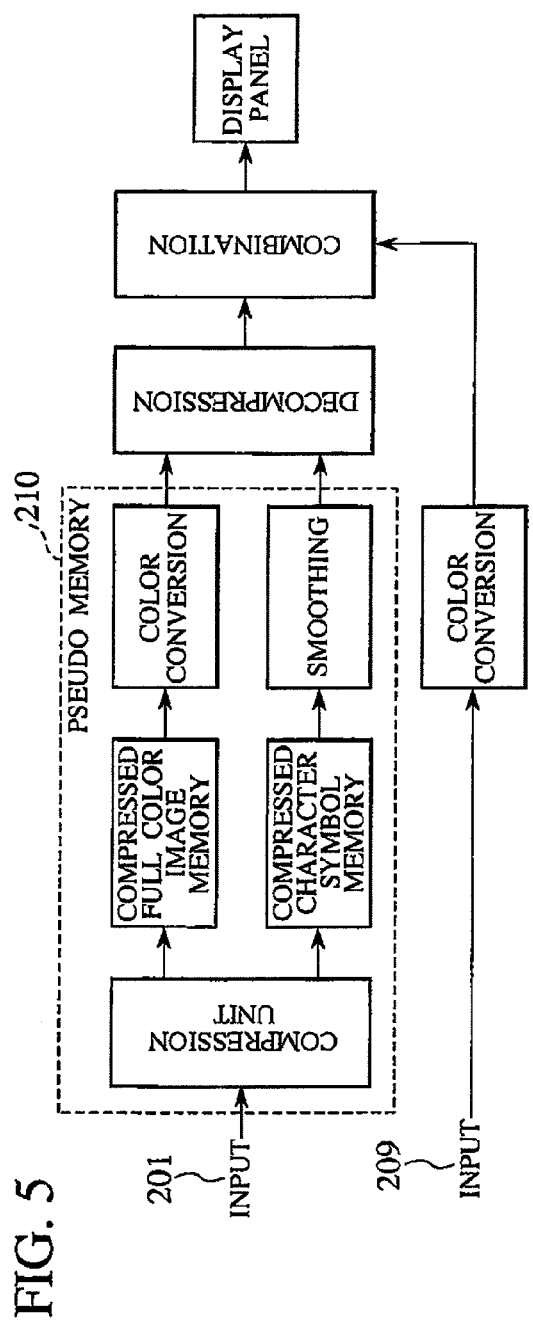
FIG. 5 is a diagram showing the configuration of a device for combining three types of image data into a single piece of data.

FIG. 5 is a diagram showing another configuration of the multi-color display device in which three types of image data is to be combined. In the configuration shown in FIG. 5, a television image signal is input as an input signal 209 to be combined with another signal to ensure that an image is displayed. For example, a television signal including a synchronization signal is broadcasted in analog terrestrial television broadcasting. The display panel is driven based on the synchronization signal on the side of a receiver. In the present invention, when the synchronization signal is included in the received television signal, an operational timing of the display panel can be set based on the synchronization signal. The other input signal may be read from the image memory based on the synchronization signal. In the abovementioned way, a plurality of image signals can be combined to ensure that an image is displayed based on the combined signal.

A pseudo memory 210 is operated to be viewed as a memory for storing bitmap data in terms of the input side or the output side of an external device. The pseudo memory 210 has a signal path for a picture and a signal path for a character symbol. In addition, the pseudo memory 210 has a reduced memory capacity to store compressed data and a signal conversion function for improving the quality of an image. The signal conversion function is to perform color conversion (described later) or to smooth the outline of a character symbol. The pseudo memory 210 may have a signal line for a picture and a signal line for a character symbol, or may have a single signal line for a picture and a character symbol.

Figure 6:
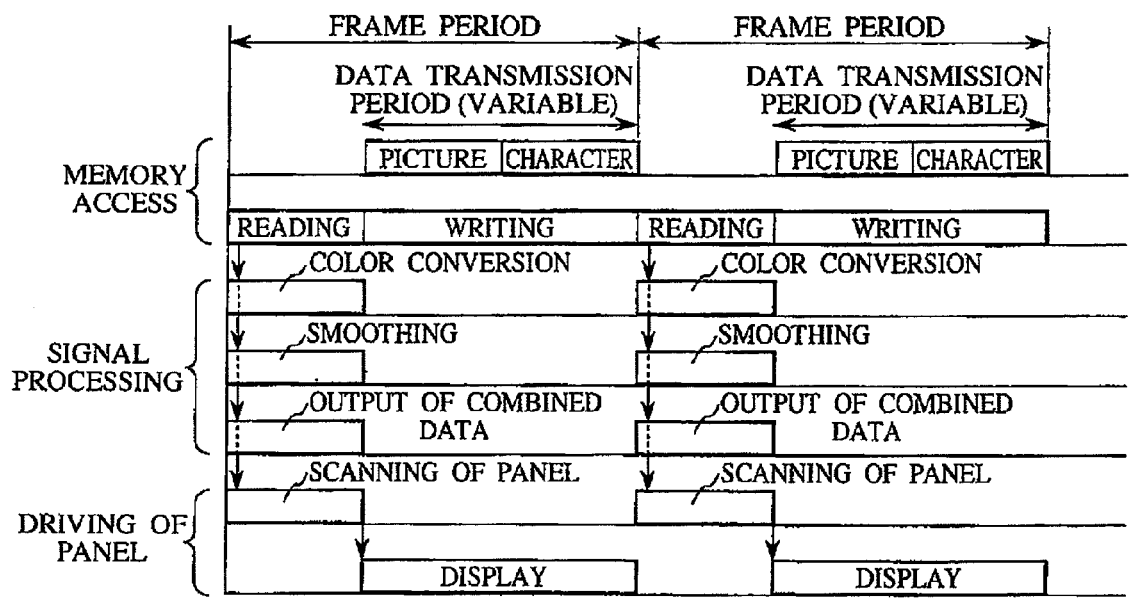
FIG. 6 is an explanatory diagram showing basic operational timings.

FIG. 6 is a diagram showing operational timings of the display device according to the present invention. The compressed data having the abovementioned structure is written in an appropriate data format in the image memory. The compressed data is read from the image memory in synchronization with the operational timing of the display panel. In general, it is not possible that an operation for writing data into a memory and an operation of reading data from the memory are performed simultaneously. The operational timing of the display panel is periodical and needs to be repeated without a delay. Thus, when the reading operation and the writing operation overlap with each other, the reading operation is prioritized over the writing operation.

According to the present invention, a picture and a character symbol are stored in the respective image memories different from each other. The picture may be an image taken by a camera and to be browsed, or be a wallpaper, and the like. The character symbol is used for an email, menu, timetable, display of an operational state, and the like. As described above, when the picture and the character symbol are used in different ways from each other, the picture and the character symbol may be generated at timings different from each other, and the picture and the character symbol may be deleted at timings different from each other. Here, consider a screen on which an operation menu (including character symbols) is displayed on a background of a picture. To rewrite the operation menu in the case where the picture and the operation menu are stored in a memory as data on one image formed by combining the picture and the operation menu, both the character symbols and the picture, which are located in a region in which the operation menu is present, are rewritten. The entire image data on the picture is rewritten when it is difficult to cut out a corresponding part of data on the picture. When the picture and the character symbols are stored in image memories separated from each other, only character symbols located in the region in which the operation menu is present are rewritten.

Figure 7:
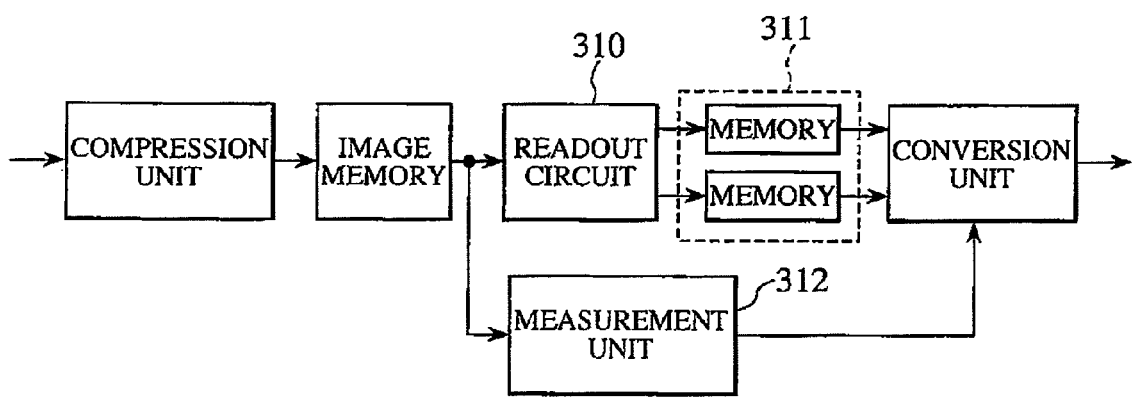
FIG. 7 is a diagram showing a readout circuit for reading data stored in an image memory.

FIG. 7 is a diagram showing the configuration of a readout circuit 310 having a buffer memory 311. The readout circuit 310 reads out compressed data as a stack of blocks and writes the compressed data in the buffer memory 311 prepared separately from the image memory. The compressed data can be read from the buffer memory 311 in synchronization with the operation of the display panel. The buffer memory 311 may be a replacement buffer. When the method for compressing data for each block is used, the memory capacity of the buffer memory 311 is equal to the amount of data for one block line corresponding to a plurality of scanning lines of the display panel. A block line memory is prepared separately from the image memory. Signal processing for decompressing and outputting compressed data is performed using the block line memory. This reduces the frequency of overlapping of the operation for reading compressed data.

The approximated color signals may be directly read from the image memory for the purpose of measurement (e.g., detection of the maximum value) of characteristics of signals representing an image, since the approximated color signals are not required to be read for a short time, compared with displaying of the image. Since the compressed data is stored in the image memory, the time of reading one image can be reduced. In the present invention, the abovementioned characteristics are used. That is, the following two types of processing are performed on the same data within a period for displaying one image: the read processing of the image data in order to measure characteristics of the signals representing the image for the purpose of signal processing for displaying the image; and the read processing for displaying the image on the display panel. To measure characteristics of the signals, for instance, when the maximum value of RGB color signals representing an image is detected, only approximated color signals for each block are read from the image memory, and the maximum value of the approximated color signals is detected without reading a selection signal. The thus-detected signal having the maximum value can be used as a control signal for controlling the amount of light emitted by a backlight. The backlight is controlled based on the control signal, and image data corresponding to the control signal is read from the image memory. An image represented by the image data is then displayed. The backlight and the display panel (liquid crystal panel) can therefore be driven in combination with each other for the image data. After the two types of read processing, different image data is written in the image memory to update the display screen (to display another image).

Advantages of the compressed data used in the present invention are as follows.

(1) Reduction in the Amount of Data to be Transmitted

A time for transmitting data on one image can be reduced.

Power consumed by the data transmission can be reduced.

The number of and time for operations for reading and writing data from and into a memory can be reduced.

(2) Reduction in the Memory Capacity

The size of the circuit provided in the display device can be reduced.

Power consumed by the operations for reading and writing data from and into a memory can be reduced.

The frequency of overlapping of the operations for reading and writing data from and into a memory can be reduced to improve the performance of the processing.

(3) Reduction in Time for Signal Processing

Signal characteristics can be measured by using partial data (e.g., detection of the maximum value of approximated color signals).

Signal conversion can be performed by using partial data (e.g., color conversion on approximated color signals).

Three-color multi-bit data is stored to allow for displaying an image represented by M types of color signals.

Second Embodiment

In general, signals to be used for display are generated and obtained by any method. The characteristics of the signals are therefore various. In the second embodiment of the present invention, the characteristic of an image is divided into two types (a picture and a character symbol). The picture includes an image taken by a camera, a design drawing, and some noise. The picture has different types of colors for each pixel. The character symbol is bitmap data converted in accordance with a command, and has a certain limited number of colors representing an image. When the display device has a unit for generating a character symbol by using a command group such as a character code and Hypertext Markup Language (HTML), the picture and the character symbol can be discriminated from each other after the generation of the character symbol.

The name of a color is led by combining certain RGB color signals. Thus, RGB color signals can be obtained based on the name of the color. When the color is generated by overlapping sixteen types of colors, the color can be represented by 4 bits. When the same color is generated by overlapping RGB (three types of) colors, the color is represented by 24 bits (3 (RGB)×8 bits). As a result, the data amount is significantly increased. Before the display panel is driven, it is necessary that compressed data be reconverted to specific RGB color signals. The name of the color is used to logically discriminate the types of colors, resulting in reductions in loads of data transmission, data storage processing and the like.

Figure 8A:
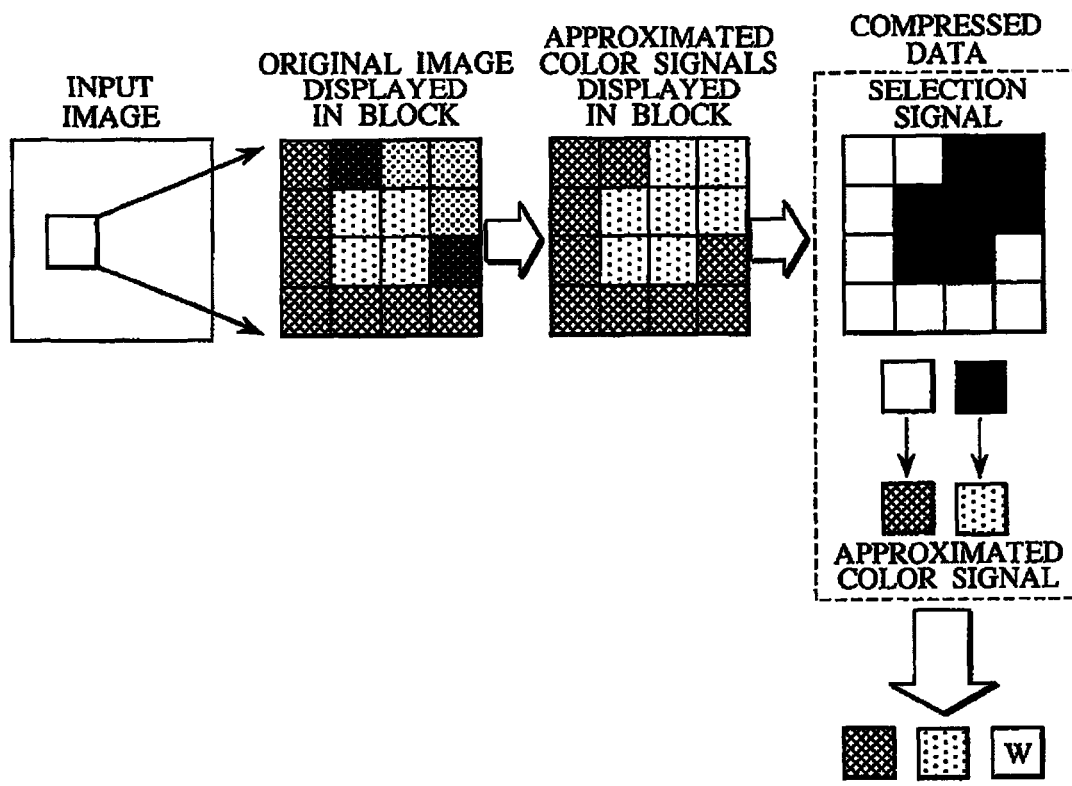
FIG. 8A is an explanatory diagram showing a principle of conversion to a white color signal using compressed data.

In the present embodiment, the signal processing is performed on approximated color signals constituting compressed data to achieve color conversion to a white signal, as shown in FIG. 8A. Similarly to the first embodiment, the approximated color signals constitute part of compressed data by selecting 4×4 pixels or 8×8 pixels as a block unit. In the case where colors represented in a block having 4×4 pixels are replaced with four types of approximated colors, color conversion is performed on four types of approximated color signals. In the case of the original image data, the color conversion is performed on color signals to be output from 16 pixels. Comparing both of the cases, the load of the signal processing according to the present invention is reduced to one fourth of that of the signal processing on the original uncompressed image data. The color conversion is performed on approximated color signals for each block. When the character symbol is an image represented by multiple colors, the types of color signals to be displayed in the entire screen are limited in many cases. The signal processing is therefore performed on color signals representing the character symbol based on the types of multiple colors while the size of the block is the entire screen.

In the present embodiment, a white color signal is generated by the color conversion performed on approximated color signals for each block. This leads to the fact that the load of the signal processing is reduced to one fourth of that of the signal processing on the original image data, as described above. The method for generating a white color signal may be selected. For example, a plurality of units may be prepared, each of which generates a white color signal. A selection unit may be provided for selecting any of the plurality of units, each of which generates a white color signal. The selection unit may be operated based on, for example, the result of measurement of signal characteristics of the display signal, the result of measurement of illuminance of an environment in which the display panel is viewed, a command specified by a user, or the like to select any of the plurality of units, each of which generates a white color signal.

Figure 8B:
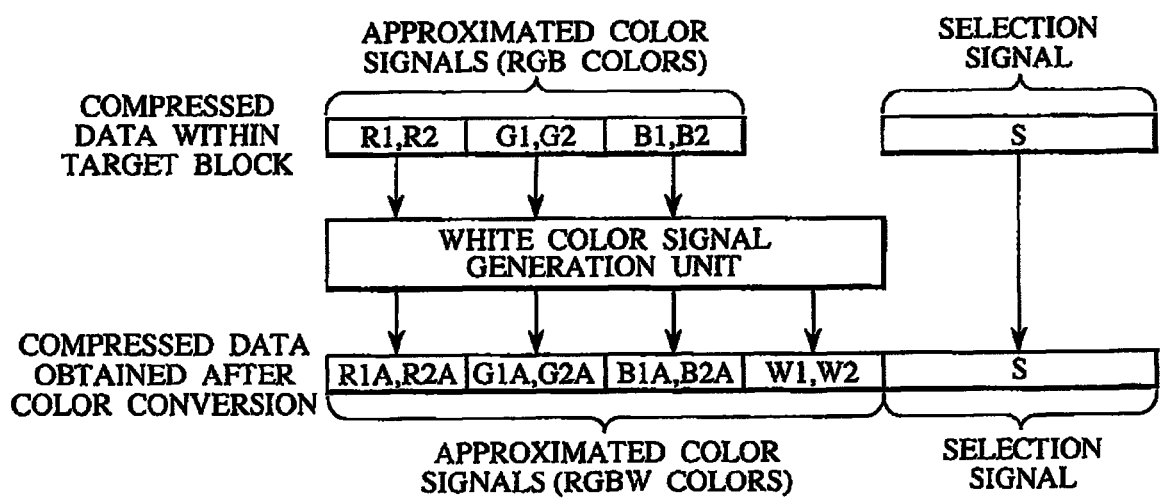
FIG. 8B is an explanatory diagram showing the conversion to the white color signal using the compressed data.

FIG. 8B shows compressed data to be used when the input signal is composed of RGB color signals and the color signals to be used within the block are replaced with two types of approximated color signals. The two types of approximated color signals Cj are discriminated by adding a suffix j to the symbol C of each of the approximated color signals. The selection signal, which is used to select one of the approximated color signals C1 (=R1, G, B1) and C2 (=R2, G2, B2) is denoted by a symbol of S. A white color signal can be generated based on a combination of the RGB colors of the approximated color signals to form the following approximated color signals C1A and C2A.

$C1A=(R1A, G1A, B1A, W1)$
$C2A=(R2A, G2A, B2A, W2)$

In this case, only the approximated color signals are modified, and the selection signal S can be used without being modified.

The color conversion, which is performed on compressed data, can be performed at both the timing of writing compressed data into the image memory and the timing of reading compressed data from the image memory. The white color signal may be generated at any of the following timings.

(1) When the compressed data is generated, the processing for generating a white color signal is performed on generated approximated color signals.

(2) When the compressed data is stored, the stored data is read, the processing for generating a white color signal is performed, and the read data is then rewritten.

(3) When the compressed data is decompressed, the processing for generating a white color signal is performed on read approximated color signals.

There are some methods, in each of which a white color signal is generated. In one of the methods, a signal having the minimum value of RGB color signals is deemed as the white color signal ($W=MIN(R, G, B)$). In another one of the methods, the white color signal is calculated based on a certain function (e.g., $W=Function(R, G, B)$) to be used for variables which represent RGB color signals, respectively.

In the present embodiment, a white color signal is generated by any of the abovementioned methods based on approximated color signals constituting part of compressed data. In addition, the following units are prepared: the plurality of units for generating respective white color signals; and the selection unit for selecting any of the plurality of units for generating respective white color signals. The selection unit uses a selection signal generated by a certain method to select one of the plurality of units for generating respective white color signals and to generate a white color signal based on approximated color signals constituting part of compressed data. This makes it possible to reduce the load of the signal processing as described above.

When multiple types of compressed data (on different types of contents such as a picture and a character symbols) is present in the image memory, the multiple types of compressed data is read from the image memory in synchronization with the scanning of the display panel. The signal processing is then performed on approximated color signals constituting part of the compressed data to achieve color conversion, thereby generating a white signal. It should be noted that both the compressed data on the picture and the compressed data on the character symbol are decompressed and combined to form a single piece of data. In this case, for example, both the compressed data on the picture and the compressed data on the character symbol are combined to ensure that the character symbol is to be displayed as a foreground image and the picture is to be displayed as a background image when the character symbol represents an operational menu. Alternatively, a transparent color may be used as a color of the character symbol to form a transparent background image.

Third Embodiment

It is general that the outline of a character symbol is important. This is apparent from the fact that a large number of types of fonts are prepared and used in the printing technology field. The outline of a character symbol is formed by a combination of pixels arranged in a plane in a display device, which is different from typical printing techniques. When an oblique line (with respect to a side of an upper surface of a pixel) is included in the outline of a character symbol and is formed by a combination of pixels, the outline of the character symbol includes a fine staircase pattern.

In the present embodiment, the outline of a character symbol is formed on the basis of a sub-pixel constituting a part of a pixel. This improves the quality of an image. Processing for forming the smooth outline of a character symbol is called smoothing processing. Data on character fonts is written in a read only memory (ROM) in advance. Necessary data is read from the ROM by converting an input command into an address for reading data from the ROM. Data on the character symbol is bitmap data, which has any resolution and is formed by combining figure elements such as a point, a line and a circle.

Figure 9:
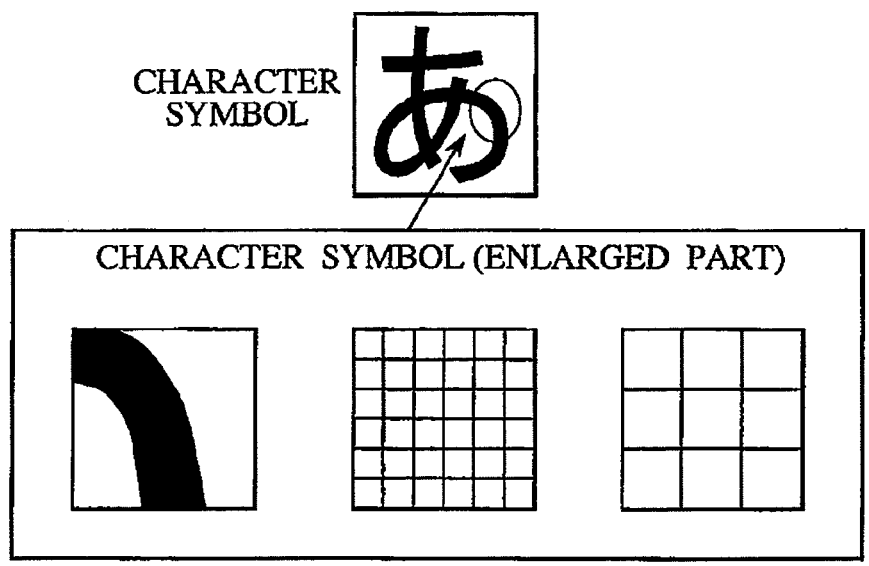
FIG. 9 is an explanatory diagram showing the outline of a character symbol.

As shown in FIG. 9, the font data represents rough and fine parts of the outline of the character symbol. The outline of the character symbol is dependent on the number of dots constituting the character symbol. The dots constituting the character symbol correspond to pixels included in the display panel. The number of the dots constituting the character symbol directly reflects the size of the character symbol to be displayed.

In the present embodiment, a character symbol having a smooth outline is displayed by converting data for each of the pixels into data for each of the sub-pixels of the display panel and controlling contrast for each of the sub-pixels of the display panel (smoothing processing). The smoothing processing is performed by monitoring the selection signal included in the compressed data. The selection signal indicates the type of an approximated color signal within the block. The difference between a selection signal for a target pixel and a selection signal for a pixel adjacent to the target pixel forms the outline of a character symbol. The number of bits of the selection signal is 1 when the number of types of approximated colors for each pixel is 2. The number of bits of the selection signal is 2 when the number of types of approximated colors for each pixel is 4. When selection signals for pixels adjacent to each other indicate respective approximated color signals different from each other, the outline of a character symbol is present in the pixels adjacent to each other.

Figure 10:
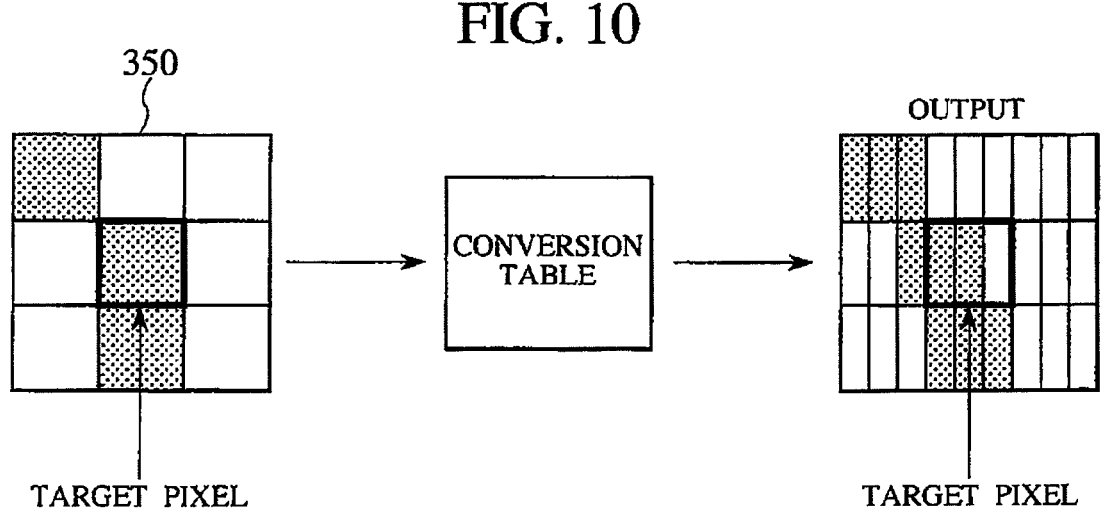
FIG. 10 is an explanatory diagram showing smoothing of the outline of the character symbol using compressed data.

In the present embodiment, the multi-color display device has a determination unit as shown in FIG. 10. The smoothing processing is performed on image data, such as data on a character symbol, which is specified by the outline thereof. Assume that two types of color signals are output in the image area of the character symbol within the block. In this case, the selection signal of the compressed data to be represented within the block selects one of the two types of color signals. In order to select multiple colors prepared on an image basis, the selection signal selects one of the two types of color signals within each block even when the bit width of the selection signal for each block is larger than one.

When the original image data to be represented by a target pixel and the original image data to be represented by a pixel adjacent to the target pixel are compared with each other, it is necessary that a circuit for handling the number of bits of the image data for each pixel be prepared. The original image is to be represented by multi-valued data having 4 to 8 bits per pixel. When the multi-valued data for a certain pixel and the multi-valued data for a pixel adjacent to the certain pixel are different from each other, the outline of a character symbol is present in the pixels. In the present embodiment, as a signal to be used to determine the outline of a character symbol, the selection signal is used to select an approximated color signal of compressed data, resulting in a reduction in the amount of data.

As described above, the selection signal for a target pixel and the selection signal for a pixel adjacent to the target pixel are input to generate a signal for controlling contrast for each sub-pixel for the purpose of smoothing the outline of a character symbol. This can be called a pattern matching method for making a determination if a pattern of the selection signal for the target pixel is matched with a pattern of the selection signal for the pixel adjacent to the target pixel. A relationship between input and output signals is created in the format of a table in advance. Each of the selection signal for the target pixel and the selection signal for the pixel adjacent to the target pixel is an input signal for referring to the table. The signal for controlling contrast for each sub-pixel constituting the target pixel is the output signal. The table is created based on the configuration of the sub-pixels of the display panel.

In the display panel having four types (RGBW) of sub-pixels, four signals are output from the respective types of sub-pixels. In order to add colors to a character symbol, data on the character symbol is first developed to ensure that the outline of the character symbol can be represented on a sub-pixel basis. The sub-pixel is the minimum unit constituting the display panel. Then, color information is added to each of the signals to be output from the respective types of sub-pixels to reproduce a color on the display panel. It should be noted that the processing (described above) for sub-pixel developing the data on the character symbol is performed regardless of the types of colors.

FIG. 11 shows an example of the abovementioned table. An input signal shown in the table is formed by combining the selection signal for a target pixel and the selection signal for a reference pixel. The number of reference pixels and the arrangement thereof can be selected. For example, eight reference pixels surrounding the target pixel can be selected. The configuration of the sub-pixels is dependent on the display panel. In the display device, an edge portion of a character symbol may affect the image quality of the character symbol. Characteristics of the display device, such as a resolution, a definition and a pixel pitch, are used with similar meanings to indicate smoothness of an edge portion of an image.

In the present embodiment, an edge portion of an image is determined based on the selection signal included in compressed data. For simplification, assume that two types of approximated color signals are used within a block, and the selection signal has one bit to select one of the approximated color signals. A unit for monitoring a pattern of the selection signal is provided. The pattern of the selection signal is formed on the basis of an area of 3×3 pixels including a target pixel.

In the display device provided with the display panel having pixels composed of three types (RGB) of sub-pixels, smoothness of an edge portion of an image is improved by using the arrangement of the sub-pixels. An example of the configuration of the display device is described below. To improve the smoothness of the edge portion of the image represented in the target pixel, the selection signal may be used on a sub-pixel basis. The selection signal is adapted to select one of a plurality of types of approximated color signals prepared for each block. Thus, in the case where the selection signal for a certain pixel has a pattern different from that of the selection signal for a pixel adjacent to the certain pixel, the selection signals selects respective approximated color signals different from each other. It can be determined whether or not an edge portion of an image is present based on the selection signals for the respective pixels adjacent to each other.

The target pixel can be modified by (1) mixing colors to be used for a background image and a foreground image (by improving smoothness of an edge portion of an image based on signal levels) or by (2) changing a region of a group of sub-pixels (hereinafter a sub-pixel group) constituting one pixel (by improving smoothness of an edge portion of an image based on the locations of sub-pixels represented by signals).

In the method (described above in (1)) for mixing colors to be used for the background image and the foreground image, an output signal capable of achieving smoothness of an edge portion of an image is composed of a color signal for the background image and a color signal for the foreground image for each of the sub-pixels constituting the target pixel. FIG. 11 shows output signals, each of which is composed of a single color signal for sub-pixels. The two color signals are calculated based on the mixed color ratio of a color used for the background image to a color used for the foreground image regardless the types of colors used for the background image and the foreground image. The mixed color ratio written in the table can be set based on an arbitrary rule. The mixed color ratio of a color used for the background image to a color used for the foreground image may be 1:1. Alternatively, the mixed color ratio may be set based on the ratio of the area of a character (black image) to the area of a background image (white image). In this case, the character and the background image are present within a single pixel.

Specifically, a signal (denoted by reference number 351 shown in FIG. 11) having nine bits is input. The input signal is composed of nine one-bit selection signals, which are included in signals to be output from 3×3 pixels (denoted by reference number 350 shown in FIG. 10). A table is prepared to show a change to a sub-pixel included in the target pixel, regarding 512 types of patterns determined by the nine-bit input signal. A value is weighted from the most significant bit to the least significant bit (in the order of scanning of three lines from the left-top portion to the right-bottom portion within the block). The nine-bit input signal therefore serves as a selection signal. A conversion table is prepared in which nine bits are to be used as an address. Data is written in the conversion table (which is a memory). When the selection signals p0 to p8 included in the nine-bit input signal 351 represent a value of "011101101", a change of data is read from the conversion table by using the value as an address.

In the method (described above in (2)), the location of the sub-pixel group constituting one pixel is changed. A white color (obtained by combining RGB colors) is achieved by combining colors represented by any one of sub-pixel groups of RGB, GBR and BRG, which are arranged in the same direction. Each of the sub-pixel groups is shifted by one sub-pixel compared with the other two sets of the sub-pixels.

In present embodiment, the location of a sub-pixel group is adjusted on a sub-pixel basis by selecting a combination of sub-pixels in order to display a certain color. The adjustment is made by using a conversion table similar to that used in the method (1) described above. When the selection signals p0 to p8 included in the nine-bit input signal 351 represent a value of "011101101", a change of data is read from the conversion table (which is a memory) by using the value as an address. The change read from the conversion table is based on the following operation.

In the area of the 3×3 pixels denoted by reference number 350 shown in FIG. 10, a black color signal output from a target pixel is converted based on the conversion table and is then output from a pixel composed of sub-pixels obtained by shifting the sub-pixels of the target pixel by one sub-pixel. After the conversion, the sub-pixel located on the left side of the target pixel represents the black color signal, and the sub-pixel located on the right side of the target pixel represents a color signal different from the black color signal, as shown in FIG. 10. The location of the sub-pixel group displaying an image is adjusted while the value of the color signal is maintained. This achieves smoothness of the outline of an image such as a character symbol.

Fourth Embodiment

The multi-color display device according to the present invention provides an effect to reduce a memory capacity due to utilization of compressed data, an effect to reduce a load of signal processing by performing signal conversion on approximated color signals included in compressed data, and an effect to reduce the load of the signal processing by measuring color signals. A description will be made of (1) signal measurement, (2) signal conversion, (3) control of a backlight provided in the display device, and (4) overdrive control.

(1) Signal Measurement

Characteristics of color signals representing image data are obtained by detecting the maximum and minimum values of the signals and obtained based on the frequent distributions of luminance and chromaticness, and the like. In general, image data is measured for each pixel. The compression method according to the present invention can be used to measure approximated color signals for each block.

(2) Signal Conversion

The signal conversion is performed on approximated color signals by using data on properties such as rates, luminance and the like of primary color signals to be output from subpixels of the display panel for the purpose of improving the quality of an image to be displayed. In general, color signals representing image data are processed for each pixel to ensure that luminance, chromaticness, and a hue of the color signals are changed. In the compression method according to the present invention, the signal conversion can be performed on approximated color signals for each block to change luminance, chromaticness, and a hue of the approximated color signals. This makes it possible to reduce a load of the signal processing. A sensor for measuring illuminance of an environment in which the display panel is viewed, or the like, may be provided in the display device. Based on the value of an output of the sensor or the like, the signal conversion can be performed on approximated color signals for each block in the same way as that described above. This technique is capable of increasing luminance when an environment is bright and of reducing luminance when the environment is dark. In addition, it is possible to reduce the load of the signal processing by performing the gamma conversion of the display signal on approximated color signals for each block.

(3) Control of Backlight Provided in the Display Device

The multi-color display device has the (liquid crystal) display panel controlling transmittance of each pixel and a backlight serving as a light source of the display panel. The backlight includes an element such as a fluorescent and a light emitting diode. Luminance of light emitted by the element of the backlight can be set to be uniform or variable based on light present outside and an image to be displayed on the display panel. The amount of light output from a screen of the liquid crystal display device is obtained by multiplying the amount of light emitted by the element of the backlight by transmittance of the display panel. In the fourth embodiment of the present invention, signal processing is performed on approximated color signals representing compressed data to adjust the amount of light emitted by the backlight based on an image to be displayed on the display panel. The principle of the signal processing will be described. In the description of the principle of the signal processing, however, a description of a non-linear element such as a gamma characteristic is omitted.

The basic operations of the signal processing according to the present embodiment are as follows: (1) the maximum value of signals to be output from pixels provided in the display panel is detected; (2) the amount of light to be emitted by the backlight is calculated to ensure that a signal having the maximum value is displayed; (3) signal conversion is performed on signals to be displayed on the display panel to ensure that the signals are output when the transmittance of the display panel is the maximum; and (4) The backlight and the display panel (liquid crystal panel) are driven to ensure that the operations (2) and (3) are synchronized with each other. The signal processing on the input signal corresponds to the operations (1) and (2). In the present embodiment, the approximated color signals constituting part of compressed data are subjected to the processing for performing the operations (1) and (2).

Figure 12:
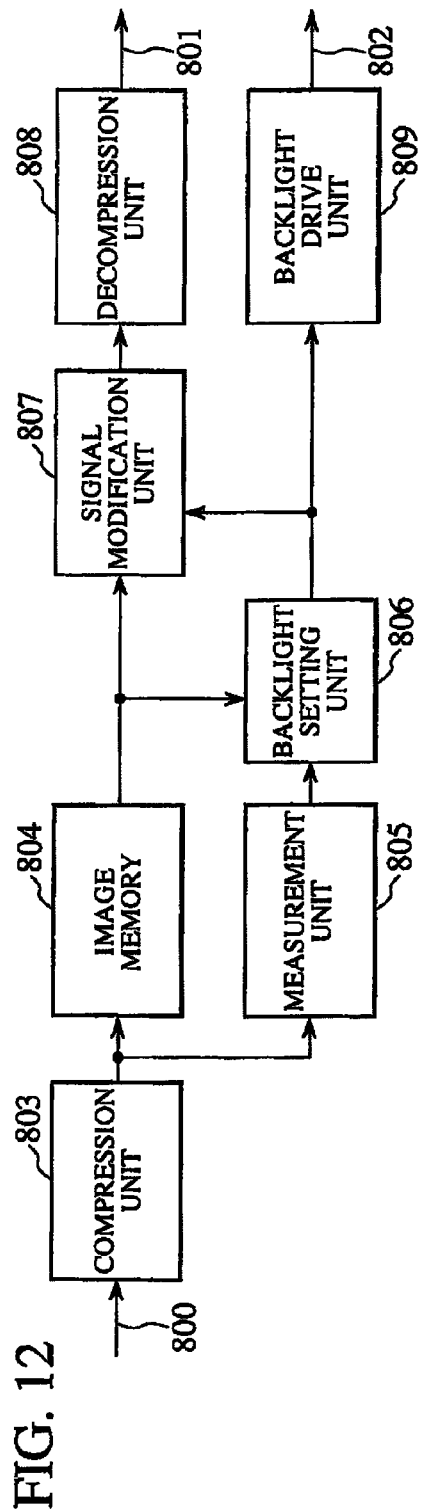
FIG. 12 is a diagram showing a backlight control function using a compression unit according to the present invention.

FIG. 12 is a block diagram showing the display device according to the present embodiment. The display device performs the abovementioned basic operations. In FIG. 12, an input signal 800 is compressed by a compression unit 803. The compressed data is then stored in an image memory 804. Characteristics (the maximum value of RGB signals to be output from pixels constituting the display panel) of approximated color signals constituting part of the compressed data are measured by use of a measurement unit 805. A backlight (BL) setting unit 806 calculates the amount of light to be emitted by the backlight based on the result of the measurement and sets the amount of the light.

A signal modification unit 807 reads the approximated color signals from the image memory 804. The signal modification unit 807 then performs signal conversion on the read approximated color signals to ensure that a value obtained by multiplying the amount of the light to be emitted by the backlight by the transmittance of the liquid crystal panel is equal to a value indicated by the input signal under the condition that the set amount of the light emitted by the backlight is maintained.

After the above signal processing, a decompression unit 808 decompresses the compressed data and outputs a signal 801 for driving each pixel of the display panel. A backlight drive unit 809 performs signal processing based on conditions such as an arrangement of the backlight with respect to the display panel and a waveform for driving the display panel and outputs a signal 802 for driving the backlight.

In the present embodiment, the signal processing is performed on the compressed data. This makes it possible to significantly reduce a load of the signal processing. The signal measurement and the signal conversion using the result of the measurement are performed on the same image data (synchronization processing). To perform the two types of processing on the same image data, a signal for at least one image is compressed. Therefore, a necessary memory capacity can be reduced. The minimum necessary amount of light to be emitted by the back light is set, resulting in a reduction in power consumed by the backlight.

As described above, the liquid crystal display device has the liquid crystal panel controlling the transmittance and the light source (backlight). The light source may have an illuminant located on the back side of a display surface of the liquid crystal panel. The liquid crystal panel is illuminated from the back side of the display surface with light of which the amount is obtained by multiplying the amount of light emitted by the light source by the transmittance of the liquid crystal panel. The liquid crystal panel includes a color filter (for reproducing a color) to display a color image. The color image is displayed with light of which the amount is obtained by multiplying the amount of light emitted by the light source for each wavelength of the light by the transmittance of the liquid crystal panel for each wavelength of the light (or integration with respect to the wavelength). When the light source emits light with fixed brightness, only the transmittance of the liquid crystal panel is controlled to obtain the result of the abovementioned multiplication.

The display device requires more power for driving the light source than that for controlling the transmittance of the liquid crystal panel. The display device is capable of driving the light source with minimum brightness necessary for displaying an image to reduce power consumption. This means that the brightness of the light source is controlled to obtain the result of the multiplication described above. The minimum amount of light emitted by the light source, which is necessary for displaying an image, corresponds to the maximum value of signals representing an image to be displayed.

To detect the maximum value, it is necessary to monitor the signals representing the image to be displayed. After the detection of the maximum value of the signals representing the image to be displayed, the image is displayed by the light source and the liquid crystal panel. To perform the above operation, it is necessary to prepare an image memory for storing image data on at least one image and synchronize the operation for monitoring the image with the operation for displaying the image.

In the present invention, the image memory storing compressed data is provided to achieve the abovementioned operation. This makes it possible to reduce the capacity of a memory necessary for the display device. In addition, since the operation is performed to detect the maximum value of approximated color signals constituting part of compressed data, the amount of data to be detected can be reduced. This results in the high-speed signal processing.

The compression unit receives and outputs data on one image. The compression unit may therefore have a unit for detecting the maximum value of signals constituting part of compressed data. In the case where a unit located on the downstream side of the image memory performs the color conversion on signals constituting part of compressed data stored in the image memory, the color conversion is performed in the same way described above in order to obtain the actual maximum value. In the case of a multi-color image, the maximum value may be detected by using the abovementioned units and based on a combination of RGB color signals.

Furthermore, it is possible to control brightness of the display panel based on brightness of an environment in which the display panel is viewed. This control corresponds to adjustment of the maximum value of signals representing an image. From the result of detection performed by the unit for detecting the maximum value of signals constituting part of compressed data, the maximum value is adjusted based on brightness of the environment. The light source is driven to obtain a necessary amount of light emitted by the light source for displaying the signal having the adjusted maximum value. In the signal processing, the brightness of the display panel can be controlled without a need for adjustment of signals for each pixel representing an image. Even when the light source illuminates a plurality of regions with light, the brightness of the light source can be controlled in the same way described above. To control the brightness of the light source in the case of the illumination of the plurality of regions, a brightness sensor can be used to detect the brightness of an environment in which the display panel is viewed. In this case, a light emitting diode or the like can be used as the light source. To control the brightness of the light source, a current or a voltage may be controlled, or pulse width modulation or the like may be performed. The light source may have a light emitting element capable of emitting white light or light emitting elements capable of emitting red, green and blue color light, respectively. The light source may have multiple light emitting elements for controlling brightness of multiple regions of the display panel.

Fifth Embodiment (4) Overdrive Control

In the liquid crystal display, a delay between an input of a signal and an output of the signal for displaying an image may occur, depending on response characteristics of a liquid crystal material used. For example, the response characteristics are called display response characteristics. Signal processing, which is called overdrive, is known as a method for improving the display response characteristics. The overdrive is performed to compare a previously-used drive signal (the value of a signal currently displayed) with the next drive signal (the value of a signal to be next displayed) for each pixel and adjust the signal to be displayed to ensure that the display response characteristics are improved. Specifically, in the case of increasing the voltage of the signal currently displayed, a voltage of the drive signal is applied to increase the voltage of the signal. To increase a voltage to change the signal currently displayed, a voltage of the drive signal is output to accelerate a brightness transition for each sub-pixel. To reduce a voltage to change the signal currently displayed, a voltage of the drive signal is output to decelerate a brightness transition for each sub-pixel. This makes it possible to improve the display response characteristics. A circuit for detecting the change of the signal requires an image memory for storing data on an image previously displayed. The data on the image previously displayed is used for the comparison. To improve the display response characteristics, it is necessary that data be read from a plurality of image memories and signals be compared with each other to adjust the signals based on the comparison result.

Figure 13:
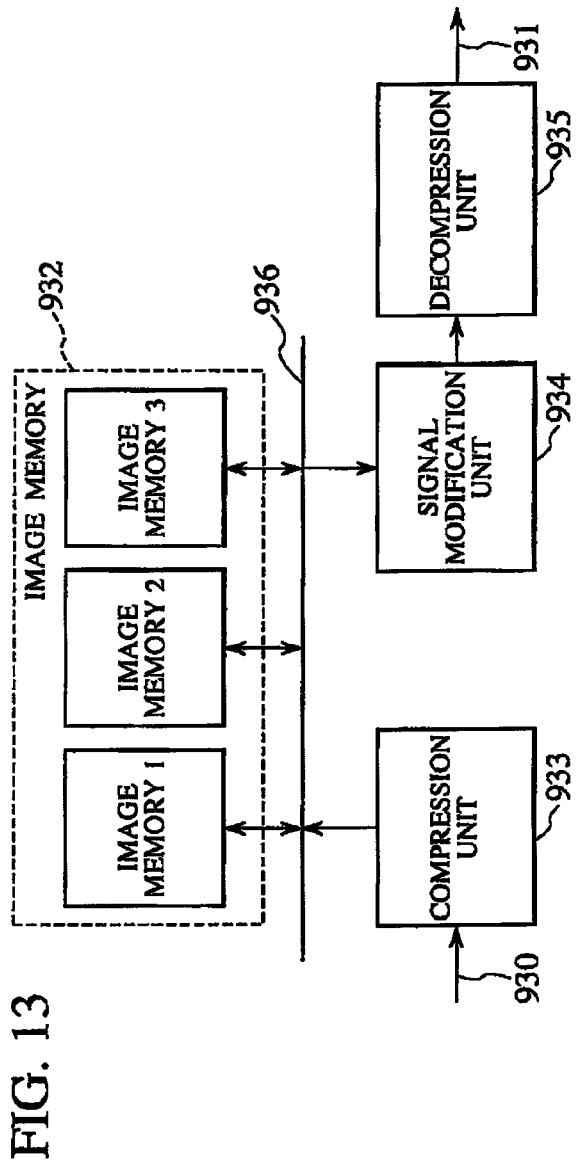
FIG. 13 is a diagram showing an overdrive control function using a compression unit according to the present invention.

In the present embodiment, an input signal 930 (image data to be compared in the abovementioned way) is compressed by a compression unit 933 and stored in an image memory 932 through signal line 936, as shown in FIG. 13. A signal modification unit 934 reads compressed image data different from that to be compared in the abovementioned way to measure a change in signals constituting the read compressed image data and adjust the signals. A decompression unit 935 then decompresses the adjusted compressed data and outputs the decompressed data as a signal 931 for driving the display panel. The display device also has a unit for controlling timings of all operations and a unit for managing the image memories.

This configuration makes it possible to reduce a memory capacity and reduce a load of processing for reading data from the image memories. The compression method, in which data can be compressed to data having one third of the amount of the uncompressed data, is used to allow the memory capacity and the time for reading data from the image memory to be reduced to one third those in the case where the compression method is not used. In this case, even when compressed data on two images is stored in the image memory, the memory capacity can be reduced by one third, compared with the case where the compression method is not used. When the image memory has the same capacity as that in the case the compression method is not used, image data on three images can be stored in the image memory.

The signal modification unit 934 can be operated to minimize the delay between an input of a signal and an output of the signal for displaying an image. The delay is varied depending on response characteristics of a liquid crystal material used. For example, three images included in image data are assigned to a previous, current, and next images, respectively, and compressed by the compression method according to the present invention to be stored. The signal modification unit 934 then measures differences among signals representing the previous, current and next images and adjust the signal. After the adjustment of the signals, the signal modification unit 934 restores a signal for each pixel and uses the restored signal as a drive signal for driving the display panel. This improves dynamic characteristics of the image. In the compression method according to the present invention, compressed data cannot be decompressed to reproduce the original image data (irreversibility). It is, therefore, preferable that the measurement and the adjustment be performed on a signal subjected to the compression processing and decompression processing, respectively. This can be achieved by use of a delay effect per image using the image memory.

In the adjustment of the signal based on the result of measuring the differences among the signals, a technique known in the control engineering can be used. For example, a response characteristic of the display panel is first measured. Based on the response characteristic, a drive signal for performing a target response operation is calculated. To reduce a difference between the actual and target response times, a method, called model control, is known.

The display device according to the present invention is provided with the image memory storing compressed data on images different from each other at timings different from each other and the signal modification unit configured based on the control engineering to adjust approximated color signals constituting part of compressed data instead of adjustment of signals for each pixel. This makes it possible to reduce a difference in response characteristic between pixels constituting the display panel. Since the signal modification unit restores (decodes or decompresses) signals for each pixel after the adjustment of the signals, the load of the processing for adjusting the signals can be reduced. It is convenient to provide a buffer memory for temporarily storing data having a certain amount to perform the signal processing. The buffer memory may be used when necessary, and description thereof is omitted.

According to the present invention, a plurality of images are compressed and stored in the image memory to perform signal processing for the purpose of improving the response characteristic. A signal for each of sub-pixels constituting the display panel is used as a target signal to be output to the display panel. In the present invention, a difference among signals constituting part of compressed data on a plurality of images is measured for each sub-pixel. To perform the measurement, the compressed data is decompressed, and an overdrive signal is obtained by performing a calculation. In addition, a difference between signals representing temporally adjacent images can be calculated under the condition that data composed of the signals is in a compressed state. This results from the fact that a difference between signals can be calculated by measuring a difference between approximated color signals constituting part of compressed data for a plurality of images within the same block. The number of types of approximated color signals is less than the number of pixels present in the block, and a difference between signals for temporally adjacent images corresponds to a difference between approximated color signals for the temporarily adjacent images. The overdrive signal can be calculated based on the approximated color signals. Each pixel selects the overdrive signal calculated based on the approximated color signals by using the selection signal for the pixel.

In the case where data composed of RGB color signals is compressed and stored in the image memory, differences between the RGB color signals and the previously input RGB color signals are calculated. The differences are converted into differences between M types of color signals and M types of color signals previously input in order to display an image on the display panel capable of displaying an image having M types of colors. Based on the converted differences, an overdrive signal for improving the response characteristic is calculated. This makes it possible to reduce the response time for displaying an image represented by the M types of color signals. According to the present invention, since data composed of three types of color signals is compressed and stored, the configuration of the image memory can be fixed regardless of M types of colors to be displayed by the display panel. In other words, the image memory for storing compressed data composed of three types of color signals can be used to calculate an overdrive signal suitable for a panel displaying M types of color signals.

In the compression method according to the present invention, compressed data cannot be decompressed to the original data due to the irreversible compression as described above. When a difference between signals for temporally adjacent images is large in a pixel, the outline of an image appears or disappears in the pixel. In the compression method according to the present invention, since the outline of an image is maintained, a change to the outline of the image can be detected with a relatively small error. Thus, it is less likely to erroneously detect a difference between signals due to the irreversible compression. It is also less likely to erroneously calculate an overdrive signal due to the erroneous detection. According to the present invention, a plurality of the image memories is provided, each of which is capable of storing compressed data. Signals constituting compressed data read from the image memories are used to improve the display response characteristic.

Sixth Embodiment

Figure 14:
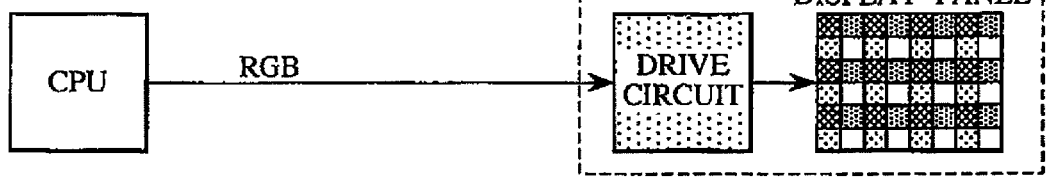
FIG. 14 is a diagram showing the configurations of the display device according to the present invention.
Figure 14:
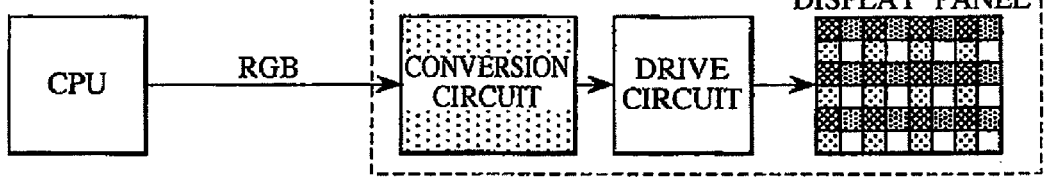
Figure 14:
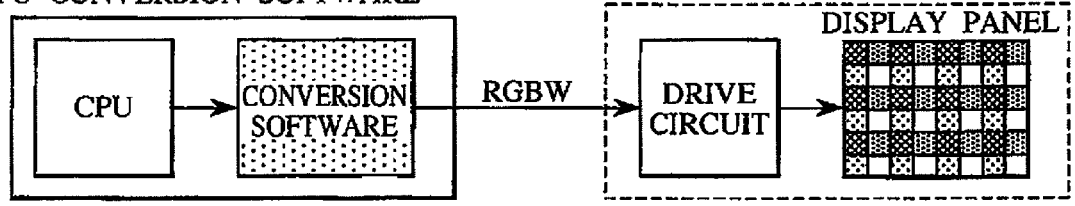
Figure 14:
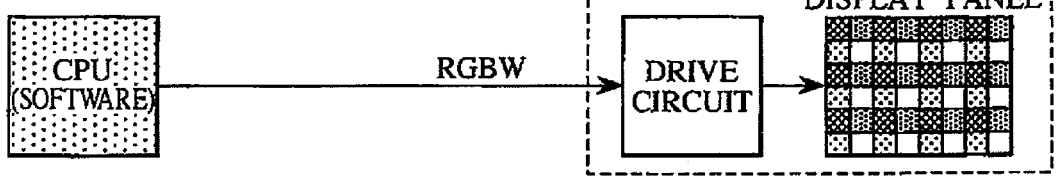

In the sixth embodiment of the present invention, the display device may have any one of configurations shown in FIG. 14. In the configuration (1) shown in FIG. 14, a circuit for driving the display panel has a CPU for executing the signal processing according to the present invention. In the configuration (2) shown in FIG. 14, a conversion circuit is added to the existing circuit and has a CPU for executing the signal processing according to the present invention. In the configuration (3) shown in FIG. 14, software is provided and executed by a CPU to perform the signal processing according to the present invention. In the configuration (4) shown in FIG. 14, font data is prepared to smooth the outline of a character and is dependent on the configuration of sub-pixels constituting the display panel.

As described above, image data is compressed at a fixed compression rate and stored in the image memory, and the signal conversion is performed using the compressed data. This makes it possible to reduce the memory capacity and simplify a signal conversion circuit. The signal conversion can improve color reproducibility and the quality of an image by smoothing the outline of the image. According to the present invention, the display panel is composed of sub-pixels displaying M types of color signals to improve the quality of an image due to the signal conversion.

While the invention has been described in its preferred embodiments, it is to be understood that the words which have been used are words of description rather than limitation and that changes within the purview of the appended claims may be made without departing from the true scope and spirit of the invention in its broader aspects.

What is claimed is:

1. A multi-color display device comprising:
    compression means comprising a plurality of compression circuits, each of which is configured to receive an input signal and to convert the input signal into compressed data including approximated color signals different from each other and a selection signal, the number of the approximated color signals being less than the number of pixels constituting a block, and the selection signal being used to select one of the approximated color signals for each one of the pixels constituting the block, each of the pixels being comprised of sub-pixels having N types of color wherein N is larger than 3), wherein:

each of the plurality of compression circuits is configured to divide color signals included in the input signal into groups, said groups being grouped according to N-dimensional space having coordinate axes representing arbitrary colors, and to generate the approximated color signals corresponding to each of the groups, and the structure of the compressed data of each of the plurality of compression circuits are substantially constant and are processed by a common decompression process, the plurality of compression circuits are configured to generate the approximated color signals from the input signal by using respective methods different from each other, and the compression means further includes:

means for selecting any one of the plurality of compression circuits; and a switch for selecting the compression circuit selected by the selection means, wherein a signal to be output from a target pixel is corrected by using the selection signal included in the compressed data, and further comprising means for outputting signals from each of the sub-pixels of the target pixel and controlling contrast for each of the sub-pixels, by comparing a selection signal for the target pixel with a selection signal for a pixel adjacent to the target pixel.

2. The multi-color display device according to claim 1, comprising means for calculating a difference between the input signal and a signal obtained by decompressing the compressed data output from each of the compression circuits, wherein the selection means selects one of the decompressed signals, which is most approximate to the input signal.

3. The multi-color display device according to claim 1, wherein color conversion is performed on the approximated color signals generated by the compression means.

4. The multi-color display device according to claim 1, wherein color conversion is performed on the approximated color signals generated by the compression means to form a white color signal.

5. The multi-color display device according to claim 1, wherein a signal for driving display panel and a signal for driving a backlight are generated to perform a backlight control by using the approximated color signals generated by the compression means.

6. The multi-color display device according to claim 1, further comprising:

an image memory for storing a plurality of images compressed by the compression means; and means for referring to the image memory to adjust approximated color signals for the purpose of improving a dynamic characteristic of a display panel.

7. The multi-color display device according to claim 1, wherein:

a compression rate of the compressed data is fixed based on setting of the size of the block and the number of types of approximated color signals, and the plurality of compression circuits are set so as to output the compressed data at the fixed compression rate which is constant among the plurality of compression circuits.

8. The multi-color display device according to claim 1, wherein the plurality of compression circuits are each configured to output the compressed data that is common among the plurality of compression circuits in block size and number of kinds of approximated color signals.

9. The multi-color display device according to claim 1, further comprising:

an image memory for storing image data on at least one image;

a display panel constituting a display screen;

means for reading the approximated color signals from the image memory in synchronization with a display operation; and means for driving the display panel displaying the approximated color signals.

10. The multi-color display device according to claim 9, further comprising:

means for wiring the compressed data into the image memory; and means for reading the compressed data from the image memory in synchronization with the display operation, wherein an operation for reading the compressed data from the image memory is prioritized over an operation for writing the compressed data into the image memory.

11. The multi-color display device according to claim 1, further comprising means for performing color conversion on the approximated color signals included in the compressed signal for each block.

12. The multi-color display device according to claim 1, wherein the correction is performed by smoothing the outline of an image displayed in the target pixel.

13. The multi-color display device according to claim 1, further comprising:

an image memory for storing image data on at least one image, wherein the image data stored in the image memory is read in order to measure the maximum value of the image data, and read to be output for displaying an image represented by the image data.

14. The multi-color display device according to claim 1, further comprising:

means for measuring the approximated color signals included in the compressed data and controlling the amount of light emitted by a backlight based on a result of the measurement.

15. The multi-color display device according to claim 1, wherein the conversion of the input signal into compressed data is an irreversible process.

16. The multi-color display device according to claim 9, wherein the conversion of the input signal into compressed data is an irreversible process.

17. The multi-color display device according to claim 13, wherein the conversion of the input signal into compressed data is an irreversible process.

* * * * *